United States Patent [19]

Brown et al.

[11] Patent Number: 5,759,606
[45] Date of Patent: Jun. 2, 1998

[54] METHOD OF PREPARING BAGEL DOUGH TO FORM AN ENGLISH MUFFIN BAGEL

[76] Inventors: Robert W. Brown, 10 Foundry St., Candor, N.Y. 17343; Bruce A. Kade, 30 Spring Rd., Chappaqua, N.Y. 10514

[21] Appl. No.: 668,689

[22] Filed: Jun. 24, 1996

[51] Int. Cl.$^6$ .................................................. A21D 13/00
[52] U.S. Cl. .................. 426/549; 426/19; 426/20; 426/61; 426/62; 426/94
[58] Field of Search ................... 426/549, 94, 289, 426/19, 20, 61, 62

[56] References Cited

PUBLICATIONS

E.J. Pyler, Baking Science & Technology, pp. 733–735, 1988.
Rombauer et al., "Joy of Cooking", p. 617, 1975.

*Primary Examiner*—Lien Tran
*Attorney, Agent, or Firm*—Carl C. Kling

[57] ABSTRACT

Preparation of English muffin bagels by using a set of yeast-rising flour bread ingredients quite similar to ingredients for standard bagels, but configuring individual buns into the cornmeal coated bun configuration of standard bagels but eliminating the boiling step of standard bagels, and adding a very long (3 hour) proofing step after the second rising to achieve effective maximum rising prior to the final baking step. The result is a bun configured like a bagel, tasting like a standard English muffin, and having a chewiness and crumbliness intermediate the standard English muffin and the standard bagel.

3 Claims, 1 Drawing Sheet

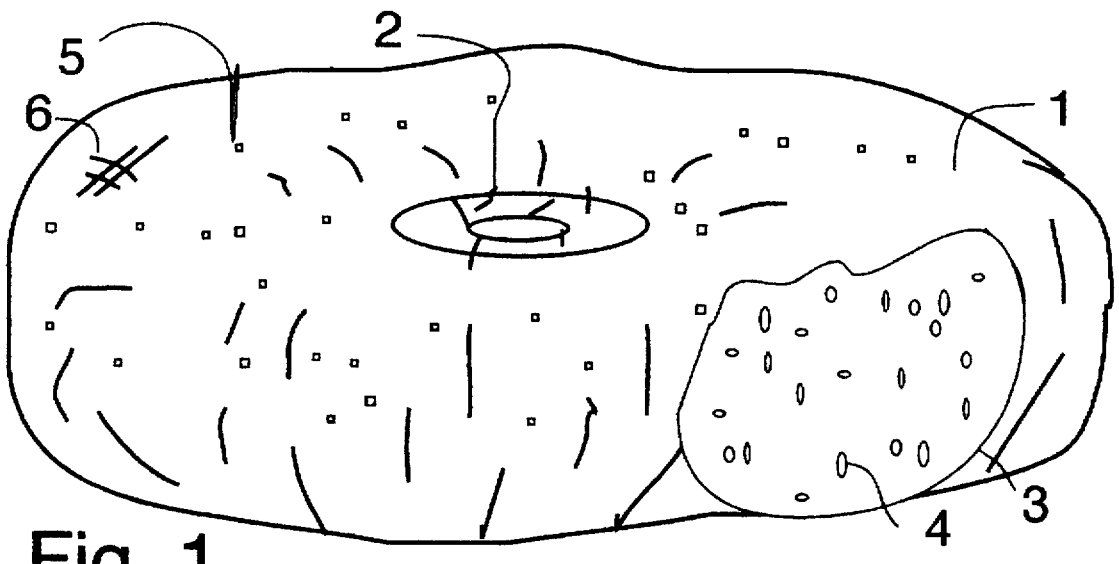

5,759,606

METHOD OF PREPARING BAGEL DOUGH TO FORM AN ENGLISH MUFFIN BAGEL

BACKGROUND OF THE INVENTION

Field of the Invention

This invention relates to bakery specialties, and in particular relates to a specialty bun which is configured like a standard bagel, which has the nook-and-cranny texture of the standard English muffin, which is intermediate in chewability between the standard English muffin and the standard bagel, and which toasts and tastes very like a standard English muffin.

Description of the Related Art

Standard bagels and standard English muffins are well known bakery specialties of yeast-risen flour.

The standard bagel is toroidal in shape like a doughnut, is smooth in texture with a tough, smooth crust and with very smooth but very chewy interior, and has a sweetish taste. Boiling in (usually sugared) water is an intermediate step prior to baking a standard bagel. The standard bagel is very tough, and is probably the most dangerous of breakfast foods —many people have cut themselves seriously while trying to slice the standard bagel into halves, while holding the standard bagel upright like a wheel. Once halved, the standard bagel bottom is typically spread with cream cheese and capped with the standard bagel top half, then eaten out of hand.

The standard English muffin is puck-shaped with flat top and bottom which form a dry crust thinly coated with cornmeal, is very porous in texture, and is much less chewy than the bagel. Standard English muffin preparation involves significant rising with a generous portion of yeast, and involves baking, with frequent turns or the mechanized equivalent, on a very hot greased griddle. The standard English muffin is typically fork-split to preserve the rough texture, toasted, spread with butter and jam and eaten out of hand.

SUMMARY OF THE INVENTION

The invention is a method of making a specialty bun by taking bagel dough through a special series of steps, most significant of which is a long rising (or proofing) period just prior to baking.

The object of the invention is to have the toasting and jam-carrying convenience of a standard English muffin along with the tastiness and some of the chewiness of a standard bagel.

A feature of the invention is the nook-and-cranny texture of the English muffin bagel without the crumbliness of the standard English muffin.

An advantage of the invention is that it provides a sweet sandwich base which is easy to fork-split for toasting, and which is tasty like the standard bagel.

Another advantage is that the muffin of the invention may be eaten like a standard bagel, may be eaten like a standard English muffin, or may be eaten as a sandwich base.

Other objects, features and advantages will be pointed out and detailed with respect to embodiments prepared along methodology of the English muffin bagel, but it will be clear to those skilled in the art that the forthcoming alterations and other changes in form and detail may be made without departure from the spirit and scope of the invention.

DRAWINGS

FIG. 1 is semischematic diagram, a stylized depiction of the English muffin bagel of the invention.

FIG. 2 is a comparative chart of preparation methods of standard bagel, and of the English muffin bagel of this invention, along a time base.

DESCRIPTION OF A PREFERRED EMBODIMENT

FIG. 1 shows semischematically a typical English muffin bagel configuration. (Incidentally, FIG. 1 also looks much like a standard bagel, except that it has the inside texture of the English muffin, with nooks and crannies instead of the smooth texture of the standard bagel.) The English muffin bagel 1 is made of recipe ingredients very similar to those of a standard bagel, excepting the cornmeal coating on the crust, but is made by a new method with a special series of steps according to the invention. These steps will be explained under the heading "PROCESS FOR MAKING ENGLISH MUFFIN BAGELS."

The English muffin bagel 1 has the doughnut shape of the standard bagel except that the central hole 2 tends to approach closure and appears much more like a navel. The English muffin bagel 1 also tends to stretch laterally while baking, and may join its neighbor on the baking pan to form a bite mark 3. Nooks and crannies 4 are visible in the bite mark 3. Cornmeal grains 5 are also visible, as is the smooth outer skin schematically shown as number sign 6.

Recipe Ingredients for English Muffin Bagels (Dooley, Editor, *Better Homes & Gardens Homemade Bread Cookbook*, 1973, page 30) BAGELS 4⅓ to 4½ cups all-purpose flour
2 packages dry yeast
1½ cups warm water (110° F.)
3 tablespoons sugar
1 tablespoon salt (We prefer high-gluten flour!) Also needed will be cornmeal for coating on the crust, as mentioned above in the first paragraph of the Description of a Preferred Embodiment.

FIG. 2 shows recipe process steps for the standard bagel and the English muffin bagel according to this invention. The ingredients for both are mixed (M) and the dough is kneaded (K) until smooth and elastic, then let rest to rise (R) for a quarter hour. Next the dough is shaped into portion-size balls (S). Another quarter hour or so of rising (R) follows. [Standard bagels at this point may be subjected to an optional short surface smoothing step, not shown in FIG. 2, by broiling on a greased pan.]

The major divergence occurs at this point. Standard bagels are boiled and simmered in water! FIG. 2 shows the boiling step as step (A) for $H_2O$. English muffin bagels are proofed, in a warm long rest and rise proofing step P) of approximately 3 hours! This long proofing step closely approaches time of maximum rising for the yeast and yeast nutrients present.

Divergence continues. The standard bagel is placed on a greased baking sheet and baked at 375° F. for a half hour or so until slightly browned. The English muffin bagel is misted with water and coated top and bottom with cornmeal—then baked on a medium-hot 375° F. lightly greased griddle until browning occur.

The standard bagel is typically cut into top/bottom halves for accepting cream cheese.

The English muffin bagel is typically fork-split, toasted, and coated with butter and jam.

The method of preparing bagel-recipe ingredients, to form an English muffin bagel, follows this procedure:
a) mixing a bagel-dough mix;
b) kneading the bagel-dough mix;
c) letting the bagel-dough mix rise in a warm environment to form first-rise bagel dough;

d) shaping the first-rise bagel dough into individual bun portions;
e) letting the bagel-dough individual bun portions rise in a warm environment to form second-rise bagel dough individual bun portions;
f) proofing the second-rise bagel dough individual bun portions in a warm environment for a proof time much greater than the sum of rise times in steps c and e, approximately 3 hours. This very long proofing step approaches the maximum rising for the yeast nutrients present. English muffin bagel dough individual bun portions are then water-misted and coated with thin top and bottom layers of cornmeal; and
g) griddle-baking the English muffin bagel dough individual bun portions to form completed English muffin bagels.

We claim:

1. A method of preparing bagel ingredients to form an English muffin bagel, comprising the following steps a) mixing a bagel-dough mix;
b) kneading said bagel-dough mix;
c) letting said bagel-dough mix rise in a warm environment for a first period of time sufficient to form a first-rise bagel dough;
d) shaping said first-rise bagel dough into a set of individual bun portions;
e) letting said set of bagel-dough individual bun portions rise in a warm environment for a second period of time sufficient to form second-rise bagel dough individual bun portions;
f) proofing said second-rise bagel dough individual bun portions in a warm environment for a third period of time of approximately three hours, said third period of time is greater than the sum of rise times in steps c and e to form English muffin bagel dough individual bun portions; and
g) griddle-baking said English muffin bagel dough individual bun portions to form completed English muffin bagels.

2. A method of preparing bagel ingredients to form English muffin bagels, according to claim 1, in which step (f) is followed by an intermediate step (f.1) of water-misting and coating top and bottom surfaces of said English muffin bagel individual bun portions with a thin layer of cornmeal.

3. A method of preparing bagel dough to form English muffin bagels, said dough including a quantity of yeast nutrients which define a maximum rising of said dough, said dough at some point during following steps being, configured into selected shapes comprising the steps of a) letting said bagel dough rise in a warm environment for a first period of time sufficient to form a first-rise bagel dough,
b) shaping said first-rise bagel dough into a set of individual bun portions;
c) letting said set of bagel-dough individual bun portions rise in a warm environment for a second period of time sufficient to form second-rise bagel dough individual bun portions;
d) proofing said second-rise bagel dough individual bun portions in a warm environment for a third period of time of approximately three hours, said third period of time is greater than the sum of rise times in steps a and c and allows for the maximum rising of the yeast nutrients present to approach, to form English muffin bagel dough individual bun portions; and
e) griddle-baking said English muffin bagel dough individual bun portions to form completed English muffin bagels.

\* \* \* \* \*